United States Patent Office 3,187,023
Patented June 1, 1965

3,187,023
16,16-DIFLUORO-17α-HALOGENOETHINYL ANDROSTANES
Cecil H. Robinson, Cedar Grove, N.J., assignor to Schering Corporation, Bloomfield, N.J., a corporation of New Jersey
No Drawing. Continuation of application Ser. No. 228,741, Oct. 5, 1962. This application Oct. 18, 1962, Ser. No. 231,552
8 Claims. (Cl. 260—397.4)

This application is a continuation of my copending application, Serial No. 228,741, filed October 5, 1962, now abandoned.

This invention relates to novel steroids, to methods for their manufacture, and to novel intermediates produced thereby. More particularly, this invention relates to therapeutically valuable steroids of the androstane series having a 17α-halogeno-ethinyl function. Specifically, this invention relates to 17α-halogenoethinyltestosterones, 16,16-difluoro - 17α - halogenoethinyltestosterones, to derivatives thereof, and to methods for their preparation.

Included among the novel steroids of this invention are 17α-halogenoethinylandrostanes of the following general formula:

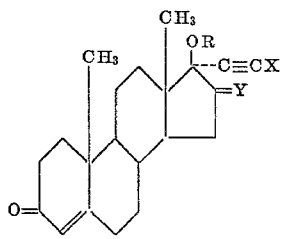

wherein R is a member of the group consisting of hydrogen and an acid radical of a hydrocarbon carboxylic acid containing up to 8 carbon atoms; X is a halogen having an atomic weight greater than 19 and less than 100; and Y is a member of the group consisting of

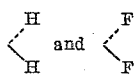

The acid radicals at C–17 included in my invention are preferably from lower alkanoic acids such as acetic, propionic, butyric, valeric, caproic, enanthic, and the like. Also included are acid radicals of arylcarboxylic acids such as benzoic acid or dibasic acids such as succinic.

There is thus included among the compounds of this invention 17α-halogenoethinylandrostanes such as the following: 17α-chloroethinyltestosterone (17α-chloroethinyl-4-androstene-17β-ol-3-one), 16,16-difluoro - 17α - chloroethinyltestosterone, 17α-bromoethinyltestosterone, and 16,16-difluoro-17α-bromoethinyltestosterone and the 17-acetate esters thereof.

The 17α-halogenoethinyltestosterones and esters thereof of this invention are physiologically active substances, being valuable as progestational agents, and thus are useful in the treatment of threatened abortion, functional dysmenorrhea and premenstrual tension. These compounds are active via the oral route and are preferably administered orally in tablet forms of 5 mg., 10 mg., and 25 mg. strength. The dosage of the particular 17α-chloroethinyltestosterone derivative used will depend on the nature and severity of the patient's illness.

The preferred compounds of this invention are those possessing a 17α-chloroethinyl group, i.e.: 17α-chloroethinyl-testosterone, 16,16 - difluoro-17α-chloroethinyltestosterone and the 17-esters thereof.

The novel steroids of this invention are conveniently prepared from 5-androstene-3β-ol-17-one or 16,16-difluoro 5-androstene-3β-ol-17-one by halogenoethination of the 17-keto functions utilizing known techniques, followed by conversion of the 3β-hydroxy-Δ⁵-moiety thereof to a 3-keto-Δ⁴-structure via Oppenauer oxidation or microbiological techniques such as that utilizing *Flavobacterium dehydrogenans*.

Thus, for example, treatment of 5-androstene-3β-ol-17-one with lithium chloroacetylide prepared by the action of methyl lithium on 1,2-dichloroethylene yields the desired intermediate, 17α-chloroethinyl-5-androstene-3β,17β-diol which upon reaction with aluminum isopropoxide in toluene utilizing known techniques gives a compound of this invention, 17α - chloroethinyl-4-androstene-17β-ol-3-one (i.e. 17α-chloroethinyltestosterone).

In a similar manner, the action of lithium bromoacetylide on 5-androstene-3β-ol-17-one followed by an Oppenauer or a microbiological oxidation such as with *Flavobacterium dehydrogenans* yields 17α-bromoethinyltestosterone of this invention.

The 16,16 - difluoro-5-androstene-3β-ol-17-one starting compound is prepared by the action of perchloryl fluoride on 16-hydroxymethylene-5-androstene-3β-ol-17-one. Conversion to 16,16-difluoro - 17α - chloroethinyltestosterone and to 16,16-difluoro-17α-bromoethinyltestosterone is then effected via the process of this invention as described hereinabove.

The 17-esters of my novel 17α-halogenotestosterones are prepared by known procedures for preparing tertiary alcohols, such as reaction with an alkanoic acid anhydride in pyridine or benzoyl chloride in pyridine whereby there is obtained the corresponding 17-alkanoate or 17-benzoate respectively. For example, reaction of 17α-chloroethinyltestosterone with warm acetic anhydride and pyridine yields 17α-chloroethinyltestosterone acetate.

The following examples are used for illustrative purpose only, and are not to be construed as limiting, the scope of my invention being defined by the appended claims.

EXAMPLE 1

*17α-chloroethinyl-4-androstene-17β-ol-3-one*
*(17α-chloroethinyltestosterone)*

(A) 17α-CHLOROETHINYL-5-ANDROSTENE-3β,17β-DIOL

To 560 mg. of lithium metal in anhydrous ether (50 ml.) is added dropwise, over 30 minutes, a solution of methyl iodide (2.5 ml.) in ether (15 ml.). The mixture is then left for one hour at room temperature, and is then cooled to 0° C. A solution of 1,2-dichloroethylene (3.1 ml.) in ether (20 ml.) is then added dropwise, over 15 minutes, and the mixture is stirred at room temperature for 30 minutes. A solution of 5-androstene-3β-ol-17-one (1.15 g.) in tetrahydrofuran (20 ml.) is then added dropwise over 15 minutes, and the mixture is stirred at room temperature for 18 hours. The reaction mixture is then cooled to −60° C. and solid ammonium chloride (5 g.) is added, followed by water. The ether is evaporated, the resulting aqueous suspension is filtered, and the residue on the filter is washed with water, dried, and chromatographed on Florisil. Elution with hexane-ether (9:1) followed by concentration of the eluates gives a residue which is crystallized from acetone-hexane to give 17α-chloroethinyl-5-androstene-3β,17β-diol, M.P. 198–200° C., [α]$_D$ −130° (dioxan).

(B) 17α-CHLOROETHINYL-4-ANDROSTEN-17β-OL-3-ONE

A solution of the compound of Example 1(A) (2 g.) in cyclohexanone (30 ml.) and toluene (90 ml.) is distilled until 24 ml. of distillate has been collected. A solution of aluminum isopropoxide (2 g.) in toluene (24 ml.) is added and the mixture is boiled for 1 hour, 30 ml. of distillate being collected during the period. The mixture is then steam distilled, the aqueous suspension which remains is filtered, and the residue on the filter is washed with water, dried, and filtered, in ether, through a short column of Florisil. The eluate is concentrated to a residue which is crystallized from methylene chloride-hexane to give 17α-chloroethinyl-4-androstene-17β-ol-3-one, M.P. 180–184° C., [α]$_D$ +2°, $$\lambda_{max.}^{MeOH}\ 240\ m\mu\ (E=17,000)$$

Example 2

16,16-difluoro-17α-chloroethinyl-4-androstene-17β-ol-3-one (16,16-difluoro-17α-chloroethinyltestosterone)

(A) 16,16-DIFLUORO-5-ANDROSTENE-3β-OL-17-ONE

To a solution of 5 g. of 16-hydroxymethylene-5-androstene-3β-ol-17-one in 1200 ml. of t-butanol is added 4.25 g. of potassium t-butoxide in 134 ml. of t-butanol. Perchloryl fluoride gas is bubbled through the solution at room temperature for 90 minutes. 500 ml. of water is then added and the mixture concentrated in vacuo to a volume of about 700 ml. A further 500 ml. of water is added and the mixture extracted with ether. The ethereal extracts are combined, washed with water, dried over sodium sulfate and evaporated in vacuo to a residue which is chromatographed on Florisil and eluted with hexane-ether (1:1). The hexane-ether eluates are combined and concentrated to a residue which is crystallized from acetone-hexane to give 16,16-difluoro-5-androstene-3β-ol-17-one, M.P. 151–154° C., [α]$_D$ +27° (dioxane).

(B) 16,16-DIFLUORO-17α-CHLOROETHINYL-5-ANDROSTENE-3β,17β-DIOL

A solution of 16,16-difluoro-5-androstene-3β-ol-17-one (1.15 g.) in tetrahydrofuran (20 ml.) is allowed to react with lithium chloroacetylide exactly in the manner of Example 1(A), and the resultant crude product is chromatographed on Florisil. Elution with hexane-ether (9:1) and concentration of the eluates gives a residue which is crystallized from acetone-hexane to give 16,16-difluoro-17α-chloroethinyl-5-androstene-3β,17β-diol.

(C) 16,16-DIFLUORO-17α-CHLOROETHINYL-4-ANDROSTENE-17β-OL-3-ONE

A solution of the compound of Example 2(B) (2 g.) in cyclohexanone (30 ml.) and toluene (90 ml.) is reacted with isopropoxide in the manner of Example 1(B) and the resultant product isolated in the described manner to give 16,16-difluoro-17α-chloroethinyl-4-androstene-17β-ol-3-one.

EXAMPLE 3

17α-bromoethinyl-4-androstene-17β-ol-3-one (17α-bromoethinyltestosterone)

By substituting 1,2-dibromoethylene for 1,2-dichloroethylene in the procedure described in Example 1(A) there is obtained 17α-bromoethinyl-5-androstene-3β,17β-diol.

A solution of 17α-bromoethinyl-5-androstene-3β,17β-diol (2 g.) in cyclohexane and toluene is reacted with aluminum isopropoxide in a manner similar to the procedure of Example 1(B). Isolation of the resultant product is effected in a manner similar to that described to give 17α-bromoethinyl-4-androstene-17β-ol-3-one.

EXAMPLE 4

16,16-difluoro-17α-bromoethinyl-4-androstene-17β-ol-3-one (16,16-difluoro-17α-bromoethinyltestosterone)

A solution of 16,16-difluoro-5-androstene-3β-ol-17-one in tetrahydrofuran is allowed to react with lithium bromoacetylide in the manner of Example 3 (first paragraph). The resultant product is isolated in the described manner to give 16,16-difluoro-17α-bromoethinyl-5-androstene-3β,17β-diol.

Reaction of 16,16-difluoro-17α-bromoethinyl-5-androstene-3β,17β-diol in cyclohexane and toluene with aluminum isopropoxide in the manner described in Example 3 (second paragraph) yields 16,16-difluoro-17α-bromoethinyl-4-androstene-17β-ol-3-one.

EXAMPLE 5

Preparation of 17-esters

A solution of 1 g. of 17α-chloroethinyl-4-androstene-17β-ol-3-one in 10 ml. of pyridine and 10 ml. of acetic anhydride is refluxed under an atmosphere of nitrogen until esterification is substantially complete as determined by paper chromatography using dinitrophenylhydrazine as the indicating reagent. The reaction mixture is cooled, poured into water and the aqueous mixture stirred for about 3 hours, then extracted with ether. The ethereal extracts are combined and washed with 5% aqueous sodium bicarbonate solution and with water. The washed solution is dried over magnesium sulfate, filtered and evaporated in vacuo to a residue which is crystallized from acetone-hexane to give 17α-chloroethinyl-4-androstene-17β-ol-3-one 17-acetate.

By utilizing techniques similar to the above-described procedure, the 17α-halogeno-4-androstenes prepared in Examples 2–4 are converted to their corresponding 17-acetate esters, i.e. 16,16-difluoro-17α-chloroethinyltestosterone acetate, 17α-bromoethinyltestosterone acetate, and 16,16-difluoro-17α-bromoethinyltestosterone acetate, respectively.

Similarly, by substituting other acid anhydrides such as propionic, caproic, succinic or capyrylic for acetic anhydride in the above procedure there are obtained the corresponding 17-propionate 17-caproate, 17-hemisuccinate and 17-caprylate esters of the aforementioned compounds.

Similarly, by substituting benzoylchloride for acetic anhydride in the general procedure of this example, there is prepared 17α-chloroethinyltestosterone benzoate.

I claim:

1. A compound selected from the group consisting of 17α-halogenoethinyltestosterones of the following formula:

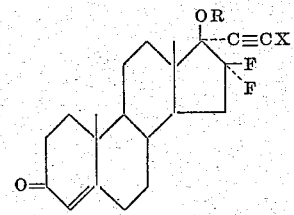

wherein R is a member of the group consisting of hydrogen and an acyl radical of a hydrocarbon carboxylic acid having up to 8 carbon atoms; and X is a member of the group consisting of a halogen having an atomic weight greater than 19 and less than 100.

2. 16,16-difluoro-17α-chloroethinyltestosterone.

3. 16,16 - difluoro-17α-chloroethinyltestosterone acetate.

4. 16,16-difluoro-17α-bromoethinyltestosterone.

5. In the process of preparing a compound selected from the group consisting of 17α-halogenoethinyltestosterones of the following formula:

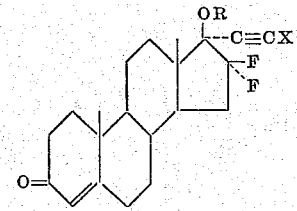

wherein R is a member of the group consisting of hydrogen and an acyl radical of a hydrocarbon carboxylic acid having up to 8 carbon atoms; and X is a member of the group consisting of a halogen having an atomic weight greater than 19 and less than 100; the steps which comprise reacting 16,16-difluoro-5-androstene-3-ol-17-one with a member of the group consisting of lithium chloroacetylide and lithium bromoacetylide in an inert solvent; subjecting the resultant product to the action of aluminum isopropoxide; said resultant product being a 16,16-difluoro-17α-halogenoethinyl-5-androstene-3β,17β-diol, said halogenoethinyl being a member of the group consisting of 17α-chloroethinyl and 17α-bromoethinyl.

6. A compound selected from the group consisting of 5-androstenes of the following formula:

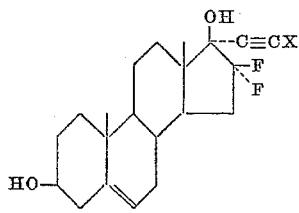

wherein X is a halogen having an atomic weight greater than 19 and less than 100.

7. 16,16 - difluoro-17α-chloroethinyl-5-androstene-3β, 17β-diol.

8. 16,16 - difluoro-17α-bromoethinyl-5-androstene-3β, 17β-diol.

References Cited by the Examiner

Burgess et al.: "Journ. Chem. Soc." December 1962 pages 4995–5005.

Robinson et al. "Journal Org. Chem." (1965) pages 975–980.

LEWIS GOTTS, *Primary Examiner.*